(12) United States Patent
Filardo

(10) Patent No.: US 10,519,926 B2
(45) Date of Patent: Dec. 31, 2019

(54) TRAVELING WAVE PROPELLER, PUMP AND GENERATOR APPARATUSES, METHODS AND SYSTEMS

(71) Applicant: Pliant Energy Systems LLC, Brooklyn, NY (US)

(72) Inventor: Benjamin Pietro Filardo, New York, NY (US)

(73) Assignee: Pliant Energy Systems LLC, Brooklyn, NY (US)

(*) Notice: Subject to any disclaimer, the term of this patent is extended or adjusted under 35 U.S.C. 154(b) by 0 days.

(21) Appl. No.: 16/167,293

(22) Filed: Oct. 22, 2018

(65) Prior Publication Data

US 2019/0055917 A1 Feb. 21, 2019

Related U.S. Application Data

(63) Continuation-in-part of application No. 15/294,635, filed on Oct. 14, 2016.
(Continued)

(51) Int. Cl.
*F03B 13/00* (2006.01)
*H02P 9/04* (2006.01)
(Continued)

(52) U.S. Cl.
CPC .............. *F03B 17/06* (2013.01); *B63H 1/37* (2013.01); *F03B 13/10* (2013.01); *H02K 7/1823* (2013.01);
(Continued)

(58) Field of Classification Search
CPC ......... F03B 17/06; F03B 13/10; F03B 13/188
(Continued)

(56) References Cited

U.S. PATENT DOCUMENTS

| 2,436,517 A | 2/1948 | Lewis |
| 3,190,618 A | 6/1965 | Katzen |

(Continued)

FOREIGN PATENT DOCUMENTS

| AU | 2006203202 | 2/2007 |
| CA | 2554316 | 1/2007 |

(Continued)

OTHER PUBLICATIONS

PCT International Search Report and Written Opinion, dated May 8, 2012, for PCT/US12/20836, filed Jan. 10, 2012.
(Continued)

*Primary Examiner* — Tulsidas C Patel
*Assistant Examiner* — Thomas K Quigley
(74) *Attorney, Agent, or Firm* — Irell & Manella, LLP

(57) ABSTRACT

The TRAVELING WAVE PROPELLER, PUMP AND GENERATOR APPARATUSES, METHODS AND SYSTEMS include force or forces applied to an arc-like flexible sheet-like material to create a deformed crenated strip fin with strained-deformations. The strained-deformations take on a sinusoid-like form that express the internal energy state of the flexible sheet-like material after it has been configured into a crenated strip fin. After being incorporated into a mechanism with couplings that prevent the crenated strip fin from returning to its un-strained state, the strained-deformations persist. Actuators may be used to sequentially rotate vertebrae attached to the fins causing the travel of sinusoid-like deformations along the fins. In a fluid medium, the traveling waves of sinusoidal deformations may exert force on the fluid causing the fluid to move and/or creating thrust. Arched blades affixed to the fins facilitate propulsion on hard surfaces such as ice.

19 Claims, 19 Drawing Sheets

Related U.S. Application Data

(60) Provisional application No. 62/357,318, filed on Jun. 30, 2016.

(51) Int. Cl.
| | |
|---|---|
| *F03B 17/06* | (2006.01) |
| *H02K 7/18* | (2006.01) |
| *B63H 1/37* | (2006.01) |
| *F03B 13/10* | (2006.01) |
| *F03B 13/18* | (2006.01) |
| *H02K 11/21* | (2016.01) |

(52) U.S. Cl.
CPC ....... *F03B 13/188* (2013.01); *F05B 2200/261* (2013.01); *F05B 2220/706* (2013.01); *F05B 2240/311* (2013.01); *F05B 2240/40* (2013.01); *F05B 2240/92* (2013.01); *F05B 2240/97* (2013.01); *H02K 11/21* (2016.01)

(58) Field of Classification Search
USPC ...................................... 290/1 R, 43, 54, 55
See application file for complete search history.

(56) References Cited

U.S. PATENT DOCUMENTS

| | | | |
|---|---|---|---|
| 3,467,013 A | 9/1969 | Conner | |
| 3,626,566 A | 12/1971 | Kilgour | |
| 3,816,774 A | 6/1974 | Ohnuki et al. | |
| 3,942,465 A | 3/1976 | Bouix | |
| 3,961,863 A * | 6/1976 | Hooper, III | F03B 13/188 417/334 |
| 4,056,742 A | 11/1977 | Tibbetts | |
| 4,151,424 A | 4/1979 | Bailey | |
| 4,164,383 A | 8/1979 | French | |
| 4,257,640 A | 3/1981 | Wiley | |
| 4,269,906 A | 5/1981 | Schmechtig | |
| 4,310,264 A | 1/1982 | Brownlee | |
| 4,371,788 A | 2/1983 | Smith, Jr. | |
| 4,375,151 A | 3/1983 | French | |
| 4,387,318 A | 6/1983 | Kolm et al. | |
| 4,448,020 A | 5/1984 | Wood et al. | |
| 4,469,596 A | 9/1984 | Kantor | |
| 4,476,397 A | 10/1984 | Lawson | |
| 4,488,854 A | 12/1984 | Miller | |
| 4,498,850 A | 2/1985 | Perlov et al. | |
| 4,558,954 A | 12/1985 | Barr | |
| 4,830,315 A | 5/1989 | Presz, Jr. et al. | |
| 5,152,674 A | 10/1992 | Marx | |
| 5,192,197 A | 3/1993 | Culp | |
| 5,230,656 A | 7/1993 | Paterson et al. | |
| 5,611,666 A * | 3/1997 | Au | B63H 1/37 416/82 |
| 5,820,342 A | 10/1998 | Au et al. | |
| 5,826,535 A | 10/1998 | Shaw | |
| 5,950,726 A | 9/1999 | Roberts | |
| 5,961,289 A | 10/1999 | Lohmann | |
| 5,961,298 A | 10/1999 | Bar-Cohen et al. | |
| 5,975,865 A | 11/1999 | Manabe | |
| 6,069,420 A | 5/2000 | Mizzi et al. | |
| 6,079,214 A | 6/2000 | Bishop | |
| 6,106,249 A | 8/2000 | Barak | |
| 6,109,888 A | 8/2000 | Marshall | |
| 6,153,944 A | 11/2000 | Clark | |
| 6,250,585 B1 | 6/2001 | Pell | |
| 6,327,994 B1 | 12/2001 | Labrador | |
| 6,357,997 B1 | 3/2002 | Rosefsky | |
| 6,361,284 B2 | 3/2002 | Drevet | |
| 6,411,015 B1 | 6/2002 | Toda | |
| 6,424,079 B1 | 7/2002 | Carroll | |
| 6,435,849 B1 | 8/2002 | Guilmette | |
| 6,579,068 B2 | 6/2003 | Bridger et al. | |
| 6,628,040 B2 | 9/2003 | Pelrine et al. | |
| 6,911,764 B2 | 6/2005 | Pelrine et al. | |
| 6,948,910 B2 | 9/2005 | Polacsek | |
| 6,952,058 B2 | 10/2005 | McCoin | |
| 7,034,432 B1 | 4/2006 | Pelrine et al. | |
| 7,064,472 B2 | 6/2006 | Pelrine et al. | |
| 7,148,579 B2 | 12/2006 | Pinkerton et al. | |
| 7,166,952 B2 | 1/2007 | Topliss et al. | |
| 7,196,450 B2 | 3/2007 | Pinkerton et al. | |
| 7,204,731 B2 | 4/2007 | Gusler | |
| 7,229,029 B2 | 6/2007 | Windham | |
| 7,244,151 B2 | 7/2007 | Gusler | |
| 7,300,323 B1 | 11/2007 | Bandyopadhyay | |
| 7,352,073 B2 | 4/2008 | Ames | |
| 7,357,684 B2 | 4/2008 | Gusler | |
| 7,362,032 B2 | 4/2008 | Pelrine et al. | |
| 7,387,179 B2 | 6/2008 | Anhalt et al. | |
| 7,470,086 B2 | 12/2008 | Jennings et al. | |
| 7,492,054 B2 | 2/2009 | Catlin | |
| 7,493,759 B2 | 2/2009 | Bernitsas et al. | |
| 7,525,212 B1 * | 4/2009 | Catlin | F03B 13/183 290/53 |
| 7,573,143 B2 | 8/2009 | Frayne | |
| 7,626,281 B2 | 12/2009 | Kawai | |
| 7,649,276 B2 | 1/2010 | Kornbluh et al. | |
| 7,696,634 B2 | 4/2010 | Filardo | |
| 7,737,608 B2 | 6/2010 | Ruggeri et al. | |
| 7,839,007 B2 | 11/2010 | Filardo | |
| 7,863,768 B2 | 1/2011 | Filardo | |
| 7,872,363 B2 | 1/2011 | Morse | |
| 8,102,072 B2 | 1/2012 | Tsou | |
| 8,120,195 B2 | 2/2012 | Pollack et al. | |
| 8,142,154 B2 | 3/2012 | Gartner | |
| 8,426,999 B2 | 4/2013 | Drevet | |
| 8,432,057 B2 | 4/2013 | Filardo | |
| 8,610,304 B2 * | 12/2013 | Filardo | F03B 17/06 290/43 |
| 2001/0010348 A1 | 8/2001 | Bilanin et al. | |
| 2002/0146333 A1 | 10/2002 | Drevet | |
| 2003/0102411 A1 | 6/2003 | Kota | |
| 2004/0008853 A1 | 1/2004 | Pelrine et al. | |
| 2004/0043677 A1 | 3/2004 | Yamamoto et al. | |
| 2004/0197519 A1 | 10/2004 | Elzey et al. | |
| 2006/0145030 A1 | 7/2006 | Cowan et al. | |
| 2006/0172629 A1 | 8/2006 | Gusler | |
| 2006/0192389 A1 | 8/2006 | Perry et al. | |
| 2006/0258912 A1 | 11/2006 | Belson et al. | |
| 2007/0031667 A1 | 2/2007 | Hook et al. | |
| 2007/0222344 A1 | 9/2007 | Kornbluh et al. | |
| 2008/0087762 A1 | 4/2008 | Hollman et al. | |
| 2008/0128560 A1 | 6/2008 | Hyde et al. | |
| 2008/0229745 A1 | 9/2008 | Ghouse | |
| 2009/0058095 A1 | 3/2009 | McClintic | |
| 2009/0134623 A1 | 5/2009 | Krouse | |
| 2010/0026003 A1 * | 2/2010 | Filardo | F03B 17/06 290/54 |
| 2010/0045036 A1 | 2/2010 | Filardo | |
| 2010/0078941 A1 * | 4/2010 | Filardo | F03B 13/188 290/52 |
| 2010/0084871 A1 * | 4/2010 | Filardo | F03B 17/06 290/54 |
| 2010/0133387 A1 | 6/2010 | Wood et al. | |
| 2010/0133848 A1 | 6/2010 | Piasecki | |
| 2010/0295417 A1 | 11/2010 | Wood et al. | |
| 2012/0175880 A1 * | 7/2012 | Filardo | F03B 17/06 290/54 |
| 2012/0299303 A1 * | 11/2012 | Bellamy | F03B 13/188 290/53 |

FOREIGN PATENT DOCUMENTS

| | | |
|---|---|---|
| DE | 102005046516 | 4/2007 |
| EP | 0322899 | 7/1989 |
| EP | 1219834 | 7/2002 |
| EP | 1783843 | 5/2007 |
| GB | 2081816 | 2/1982 |
| GB | 2129059 | 5/1984 |
| RU | 2347944 | 2/2009 |

(56) References Cited

FOREIGN PATENT DOCUMENTS

WO    WO0202309    1/2002
WO    WO07029275   3/2007

OTHER PUBLICATIONS

Jham, "Anaconda wave-power generator snakes into next stage of production," http://guardian.co.uk.environment/2009/may/06/anaconda-wave-power, May 6, 2009.

"Checkmate Seaenergy are proud to present the Anaconda Wave Energy Converter," Introduction page, http:11www.checkmateuk.com/seaenergy/introduction.html, printed on Jun. 4, 2009.

"Checkmate Seaenergy are proud to present the Anaconda Wave Energy Converter," The Anaconda system page, http://www.checkmateuk.com/seaenergy/system.html, printed on Jun. 4, 2009.

"Checkmate Seaenergy are proud to present the Anaconda Wave Energy Converter," Economics page, http:11www.checkmateuk.com/seaenergy/economics.html, printed on Jun. 4, 2009.

"Checkmate Seaenergy are proud to present the Anaconda Wave Energy Converter," Technology page, http://www.checkmateuk.com/seaenergy/technology.html, printed on Jun. 4, 2009.

"Checkmate Seaenergy are proud to present the Anaconda Wave Energy Converter," Wave Energy Potential page, http://www.checkmateuk.com/seaenergy/potential.html, printed on Jun. 4, 2009.

"Checkmate Seaenergy are proud to present the Anaconda Wave Energy Converter," The Anaconda Team page, http://www.checkmateuk.com/seaenergy/team.html, printed on Jun. 4, 2009.

"Checkmate Seaenergy are proud to present the Anaconda Wave Energy Converter," Downloads and Links page, http://www.checkmateuk.com/seaenergy/links.html, printed on Jun. 4, 2009.

"Checkmate Seaenergy are proud to present the Anaconda Wave Energy Converter," Project News page, http://www/checkmateuk.com/seaenergy/news.html, printed on Jun. 4, 2009.

"Vivace (Vortex Induced Vibrations Aquatic Clean Energy)," Technology page, http://www.vortexhydroenergy.com/html/technology.html, printed on Jun. 10, 2009.

Giles, "Harnessing river whirlpools puts energy on tap," http://www.newscientist.com/article/mg19826516.200-harnessing-river- . . . 1, Apr. 11, 2008, printed on Jun. 10, 2009.

PCT International Search Report and Written Opinion, dated Aug. 1, 2008 for PCT/US08/05605, filed May 1, 2008.

PCT International Search Report and Written Opinion, dated Dec. 24, 2009 for PCT/US09/62257, filed Oct. 27, 2009.

PCT International Search Report and Written Opinion, dated Jan. 27, 2010 for PCT/US09/64241, filed Nov. 12, 2009.

Supplementary European Search Report and European Search Opinion, dated Jun. 20, 2012 for EP Application No. 09847665.8, filed Nov. 12, 2009.

\* cited by examiner

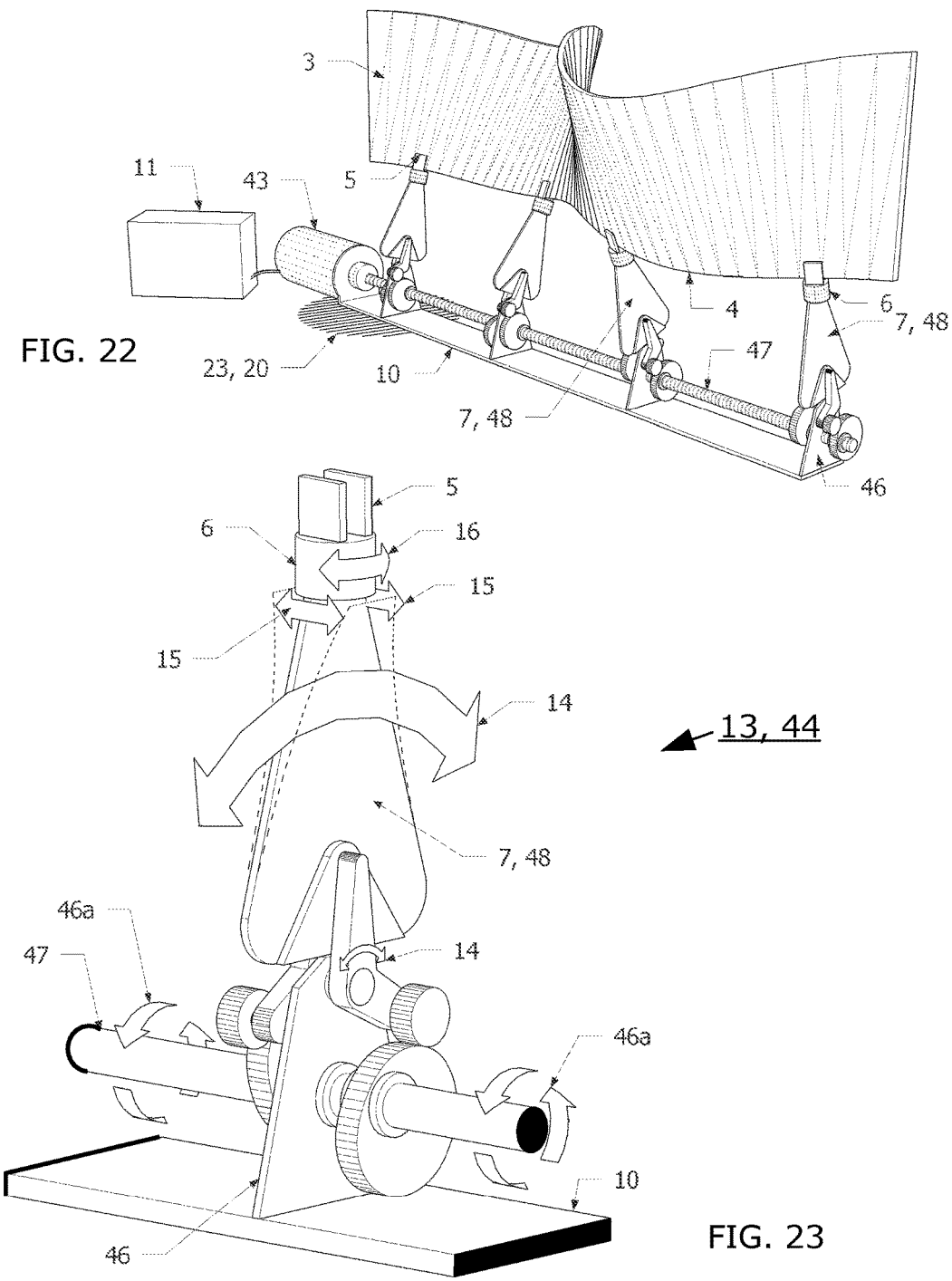

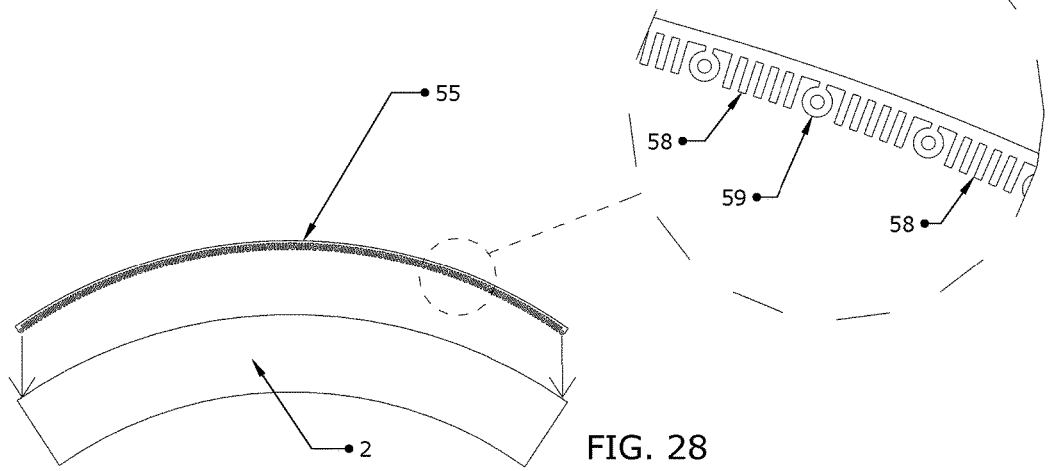
FIG. 32
FIG. 28
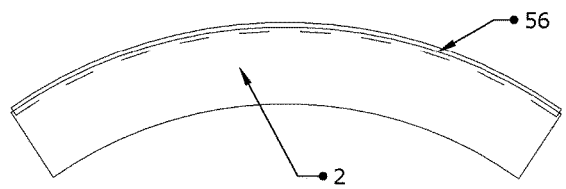
FIG. 29
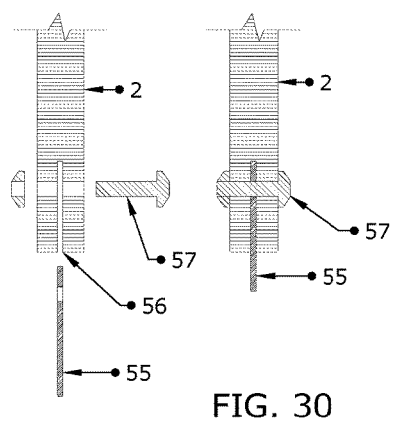
FIG. 30
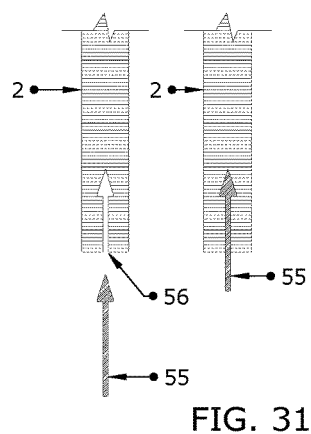
FIG. 31

TRAVELING WAVE PROPELLER, PUMP AND GENERATOR APPARATUSES, METHODS AND SYSTEMS

PRIORITY CLAIM

This application is a Continuation-in-Part of and claims priority to co-pending Non-Provisional application Ser. No. 15/294,635 filed Oct. 14, 2016 entitled, "Traveling Wave Propeller, Pump and Generator Apparatuses, Methods and Systems", which in turn claims priority under 35 U.S.C. § 119 to prior U.S. provisional application Ser. No. 62/357,318 filed Jun. 30, 2016 entitled, "Traveling Wave Propeller, Pump and Generator Apparatuses, Methods and Systems". The entire contents of the aforementioned applications are incorporated in their entirety herein by reference.

This invention was made with government support under contract #N00014-16-C-3042 awarded by the Office of Naval Research. The government has certain rights in the invention. This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address energy conversion, and more particularly, include TRAVELING WAVE PROPELLER, PUMP AND GENERATOR APPARATUSES, METHODS AND SYSTEMS.

BACKGROUND

Mechanical devices actuated to perform prescribed motions for a variety of purposes are ubiquitous. Such devices may be configured to effectuate automated movements in or on a variety of media, such as on land, underwater, or in the air. In some cases, sensors may be employed to provide data about device motion, device orientation, environmental factors, and the like. Sensor data may then be used to control actuation of motors to produce the prescribed motions for a particular device configuration or environment,

SUMMARY

Aspects of the disclosed apparatuses, methods and systems include devices which create repetitive or undulating motion, or effect, to produce useful work, such as for a propulsion system or other system, including energy-harnessing systems.

In one embodiment force or forces are applied to an arc-like flexible sheet-like material to create a deformed crenated strip fin with strained-deformations. The strained-deformations take on a sinusoid-like form that express the internal energy state of the flexible sheet-like material after it has been configured into a crenated strip fin. After being incorporated into a mechanism with couplings that prevent the crenated strip fin from returning to its unstrained state, the strained-deformations persist. Actuators may be used to sequentially rotate vertebrae attached to the fins causing the travel of sinusoid-like deformations along the fins. In a fluid medium, the traveling waves of sinusoidal deformations may exert force on the fluid causing the fluid to move and/or creating thrust. In some land-based embodiments, the fins may be configured and the actuators operated to create a crawling action. Some examples of applications in various embodiments include propulsion systems for sub-sea vessels, personal propulsion systems attachable to the body of a swimmer or diver, surface vessels, amphibious vehicles, lighter-than-air craft, and the pumping, mixing and transportation of fluids, powders, and aggregates. Components and assemblies are described.

Where the actuators are of a type that are capable of harnessing energy, such as electromagnetic motors or dielectric elastomers, the mechanisms may also harness energy when fixed in an environment with moving fluid.

BRIEF DESCRIPTION OF THE DRAWINGS

The accompanying appendices and/or drawings illustrate various non-limiting, example, innovative aspects in accordance with the present descriptions:

FIG. 22 shows an implementation having a cam in one embodiment; and

FIG. 23 shows details of a transmission assembly of an implementation having a cam in one embodiment;

FIGS. 28-29 show an arched blade added to one edge of the arc-like flexible sheet-like material in one embodiment;

FIG. 30 shows a cross section through the edge of the flexible sheet-like material in one embodiment;

FIG. 31 shows a cross section of an implementation in which the arched blade has a thickening or flange along the edge in one embodiment;

FIG. 32 shows an implementation of the arched blade wherein the outer radius edge of the arched blade forms a continuous arc but its inner edge is comprised of a series of narrow tabs in one embodiment;

DETAILED DESCRIPTION

Figure 1:
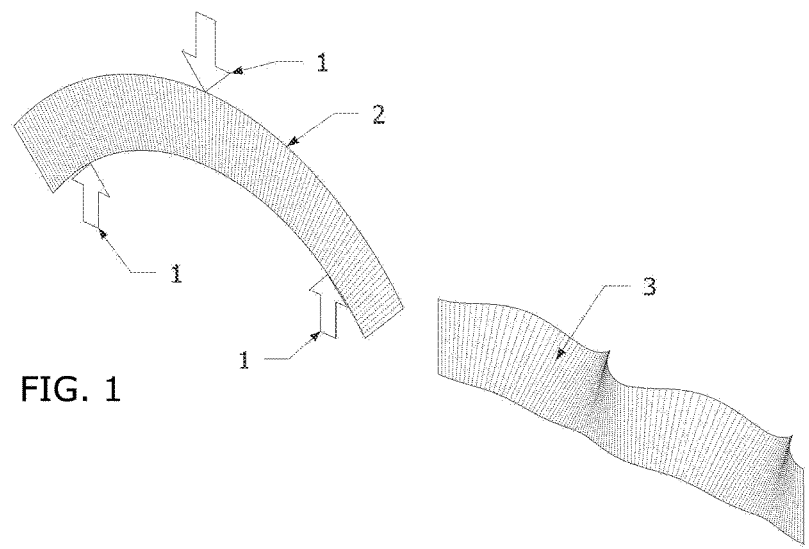
FIG. 1 shows the formation of a crenated strip fin in one embodiment.
Figure 2:
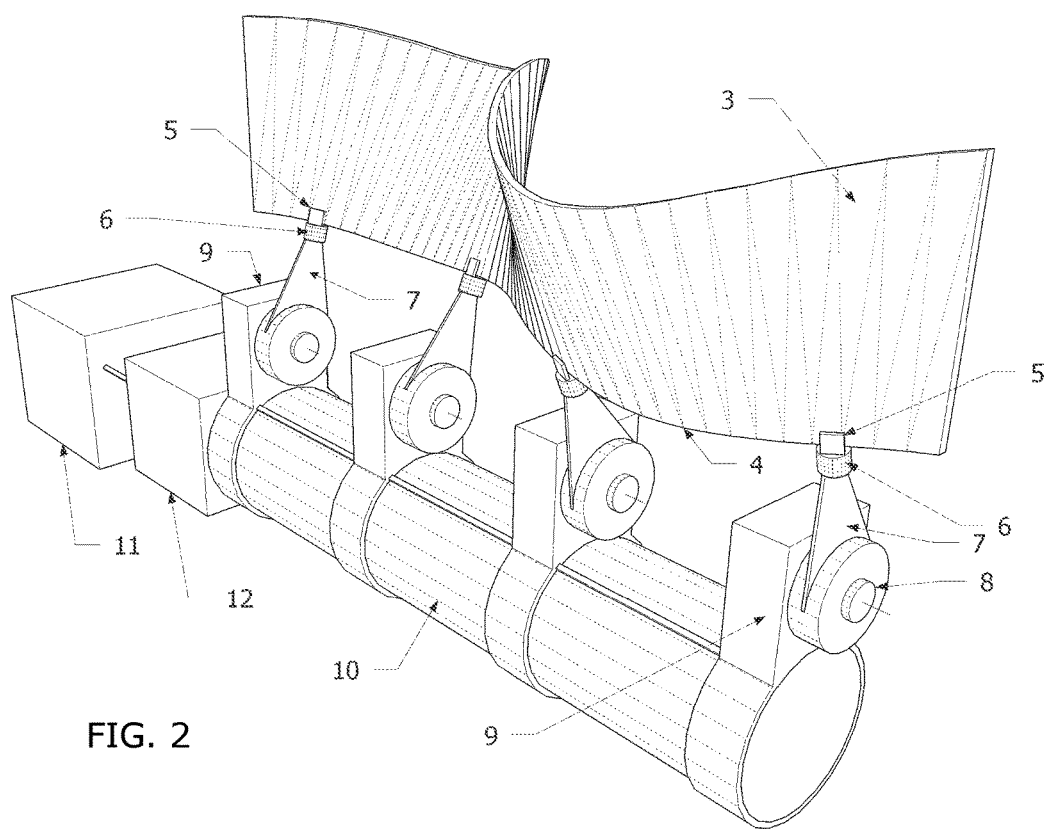
FIG. 2 shows a configuration of a crenated strip fin assembled into a mechanism in one embodiment.

Force or forces 1 are applied to an arc-like flexible sheet-like material 2 to create a deformed crenated strip fin 3 with strained-deformations, FIG. 1. The strained-deformations take on a sinusoid-like form that express the internal energy state of the flexible sheet-like material 2 after it has been configured into a crenated strip fin 3. After being incorporated into a mechanism with couplings 5, 6, 7, 10, FIG. 2 for example, that prevent the crenated strip fin 3 from returning to its un-strained state, the strained-deformations persist.

Figure 3:
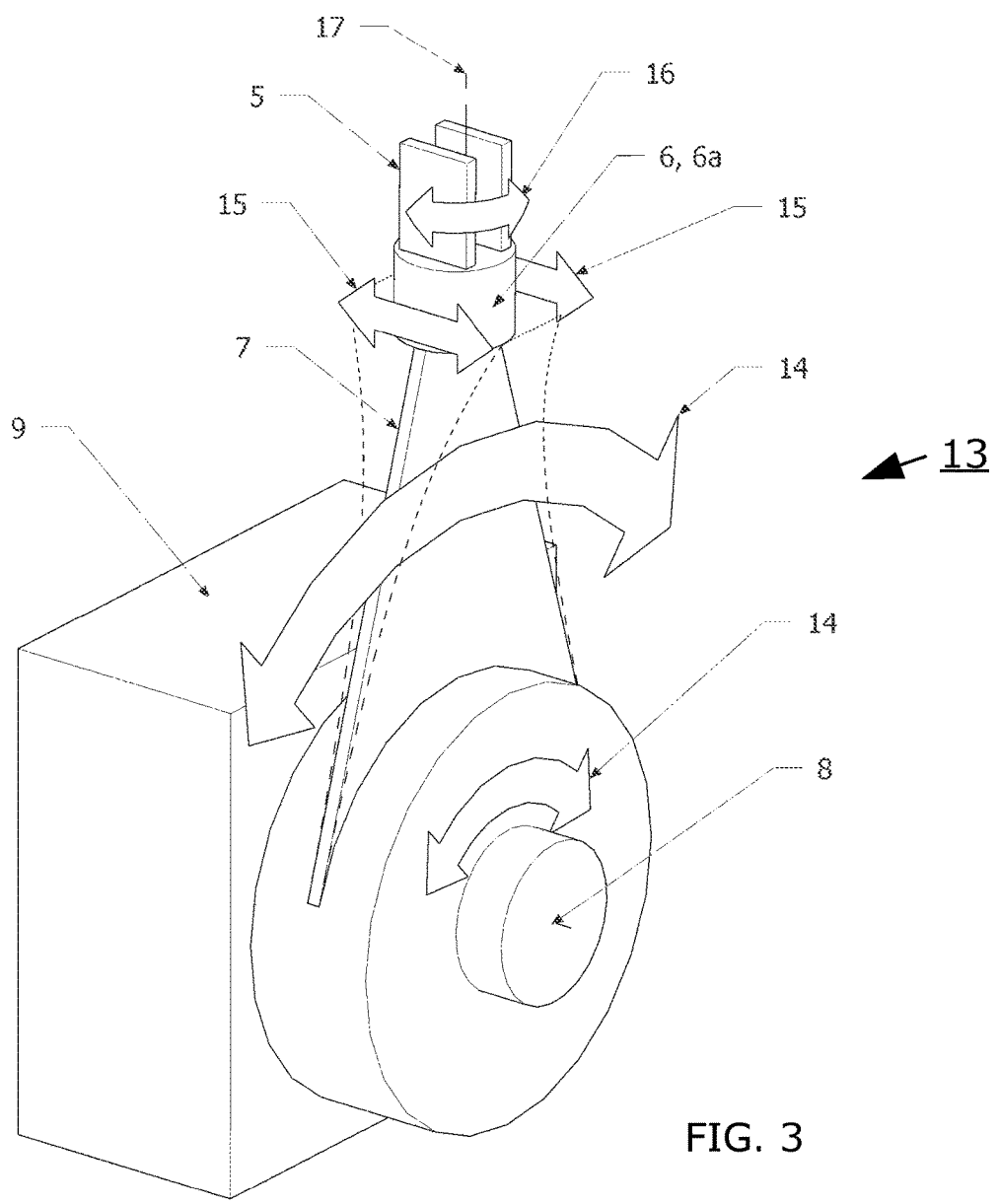
FIG. 3 shows details of a transmission assembly in one embodiment.
Figure 4:
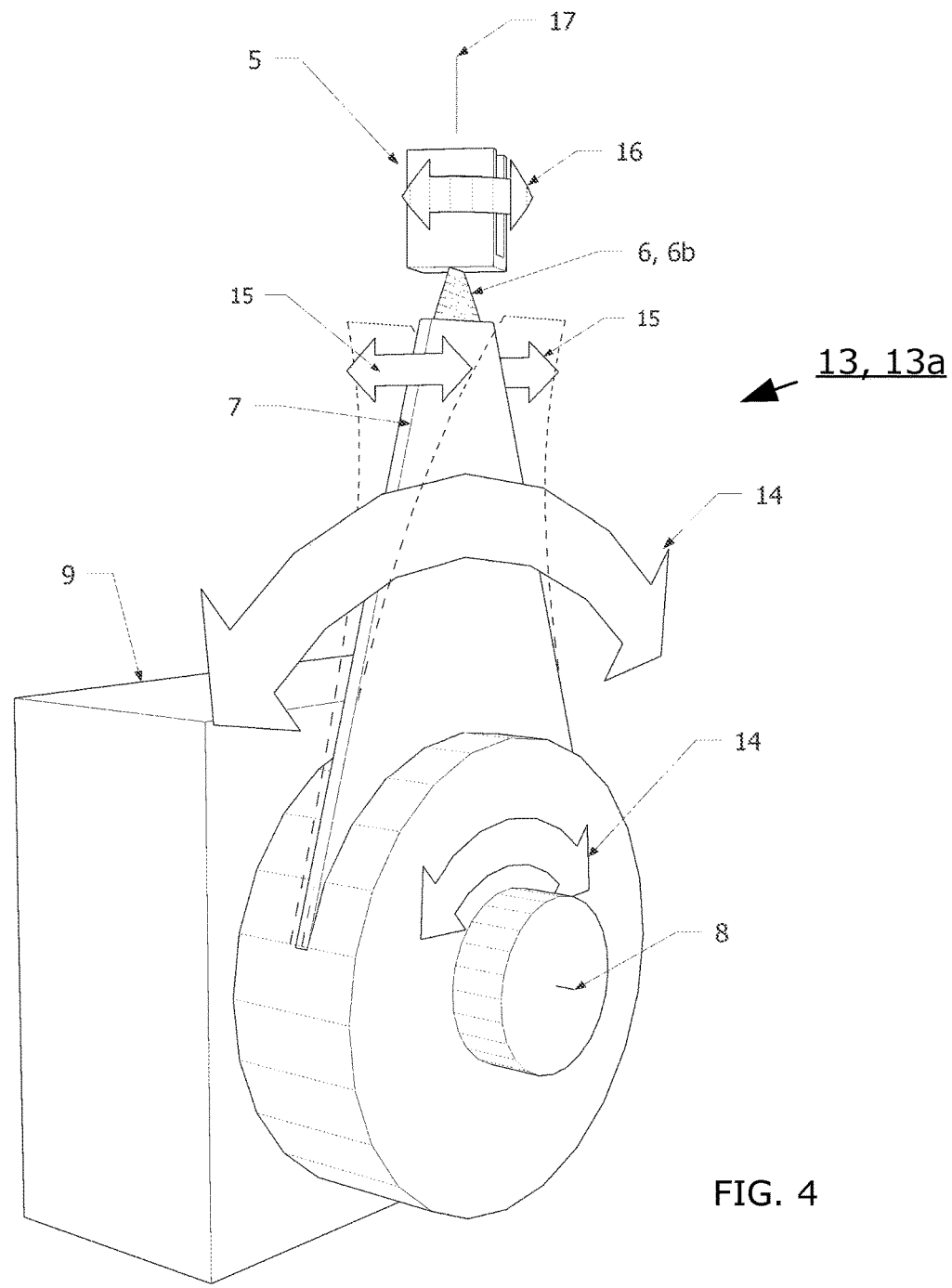
FIG. 4 shows details of a transmission assembly in one embodiment.

In one embodiment, in its strained state the crenated strip fin 3 is prevented from returning to its relaxed state by being fixed in at least two locations along an inner edge 4 to a first coupling 5 that is fixed to a vertebra plate 7, for example, via a rotation-enabling component 6 which may be a bearing 6a, FIG. 3, or other component that allows the transmission of force from the first coupling 5 and vertebra plate 7 while allowing partial rotation between the first coupling 5 and the vertebra plate 7, such as a flexible planar plate 6b, FIG. 4, torsion spring, rubber bushing and/or the like. The vertebra plate 7 is fixed to the shaft 8 of an actuator 9 such as an electromagnetic motor, hydraulic motor, servo etc., FIG. 2. The actuators may be fixed to a common member 10 and are powered by a battery 11 or other power source. In one embodiment the rotational positions of the actuators 9 may be controlled by a central controller 12.

In one embodiment the first coupling 5, rotation-enabling component 6, vertebra plate 7 and shaft 8 comprise a transmission assembly 13, FIG. 3.

In one embodiment the point of attachment of the crenated strip fin 3 to the transmission assembly 13, 13a, 13b has three degrees of freedom of movement. The actuator 9 induces rotation 14 of the vertebra plate 7 about the axis of the shaft 8. Since in one embodiment the vertebra plate 7 is flexible in the direction 15 parallel to the axis of the shaft 8, the end of the vertebra plate 7 where it is fixed to the rotation-enabling component 6 is able to shift 15 in a direction parallel to the axis of the shaft 8. The rotation-enabling component 6 allows the first coupling 5 to at least partially rotate 16 about an axis 17 perpendicular to the shaft 8, FIG. 4.

Figure 5:
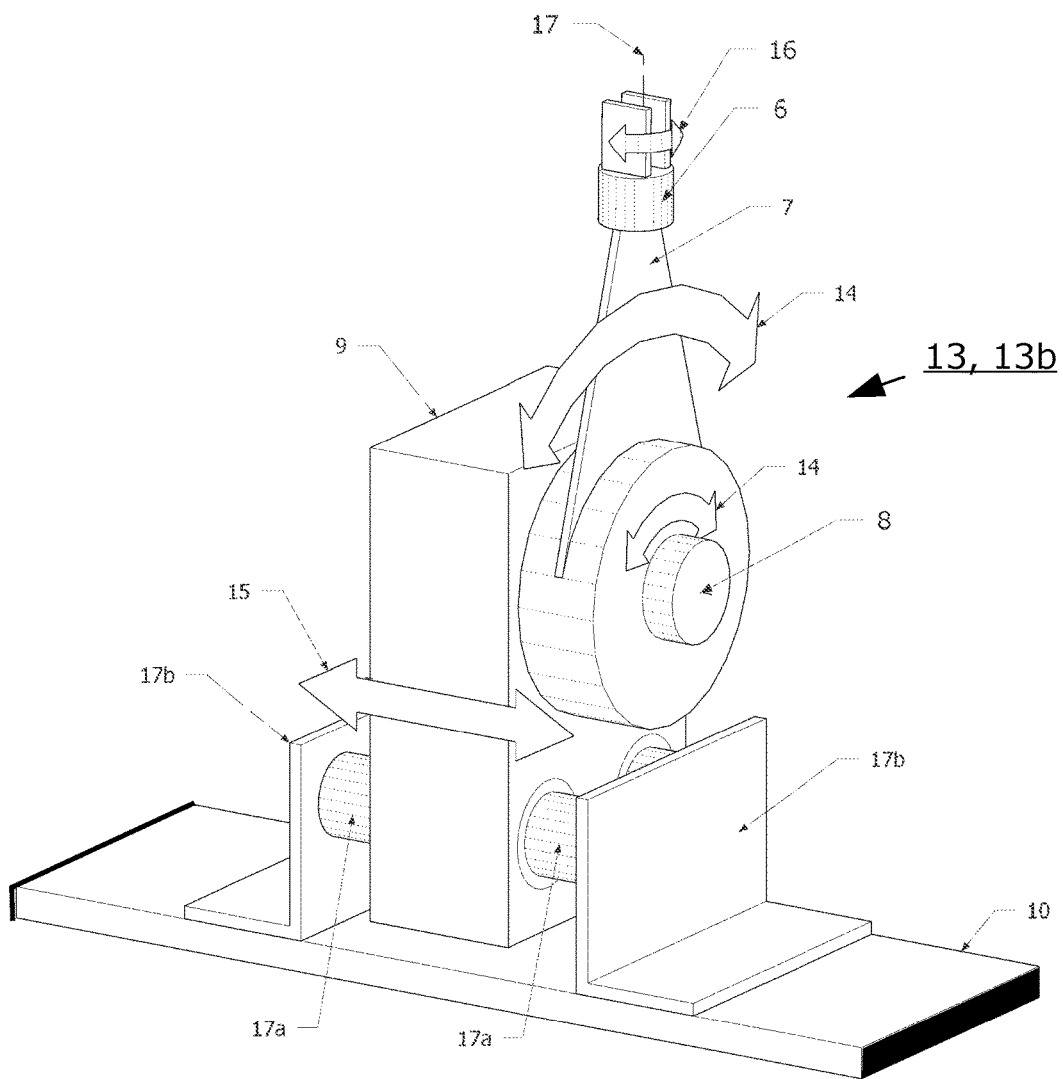
FIG. 5 shows details of a transmission assembly in one embodiment.

In one embodiment, the vertebra plate 7 may be rigid and motion of the transmission assembly 13, 13b in a direction 15 parallel to the direction of the axis of the shaft 8 may be facilitated by a bearing track, sleeve bearings 17a and/or the like, FIG. 5. The 8 transmission assembly 13, 13b may be coupled to the common member 10 via mounting fixtures 17b.

Figure 6:
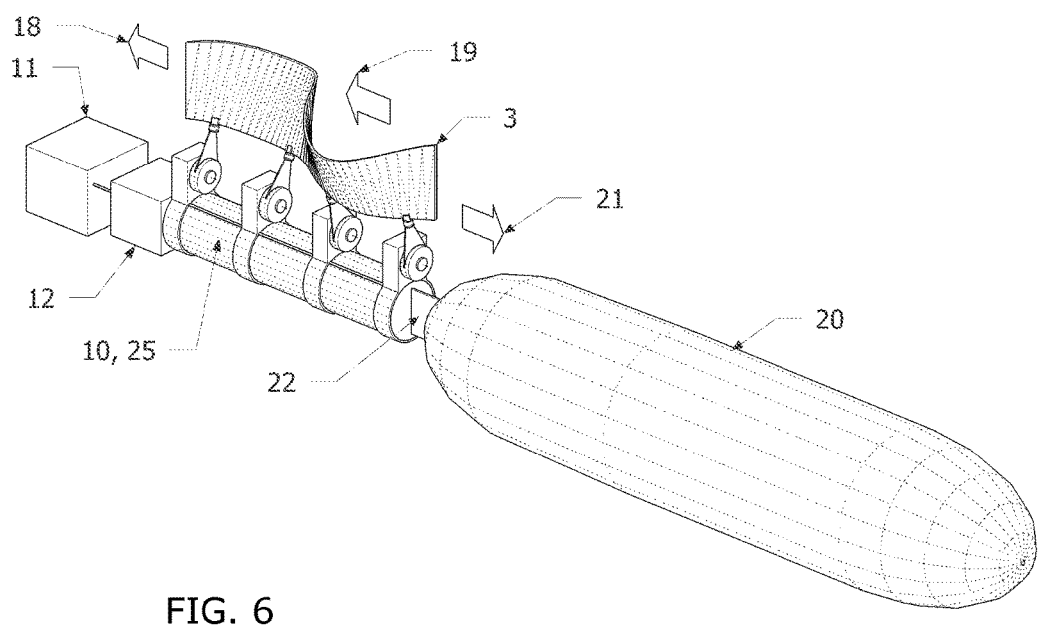
FIG. 6 shows an embodiment attached to a vessel and mode of operation in one embodiment.

The central controller 12 induces the actuators 9 to rotate the vertebra plates 7 clockwise and counterclockwise in a sequence that causes a traveling wave to move along the crenated strip fin 3. When the mechanism in placed in a fluid medium, FIG. 6, fluid is primarily moved 18 in the direction of the traveling wave 19, causing the mechanism as well as a body 20 that may be attached to it via a harnessing fixture 22, to travel in a direction 21 opposite to that of the traveling wave 19. Some examples of applications include surface craft or sub-sea marine propulsion, propulsion for lighter-than-air vehicles and/or the like.

The central controller 12 and battery 11 or other power source may be placed, e.g., inside the common member 10 which in some implementations may be water tight or air tight. One fin, or two fins FIG. 7, or more than two fins may, in one implementation, be attached to the common member 10 via transmission assemblies 13, 13a, 13b, to create a free-swimming vessel or vehicle which is able to move through fluid by imparting forces to the fluid, such as described above. For a craft utilizing such an embodiment, thrust vectoring may be facilitated to control the vessel's pitch, yaw, roll, direction, turning, and other controlled movements which may be executed via the central controller 12. Sensors such as accelerometers, gyroscopes, inertial measurement units, compass, optic flow sensors, sonar, lidar, and fluid motion sensors such as pressure and velocity sensors, and/or the like, may feed into the central controller 12 to achieve desired behavior of the vessel, vehicle or mechanism.

Figure 7:
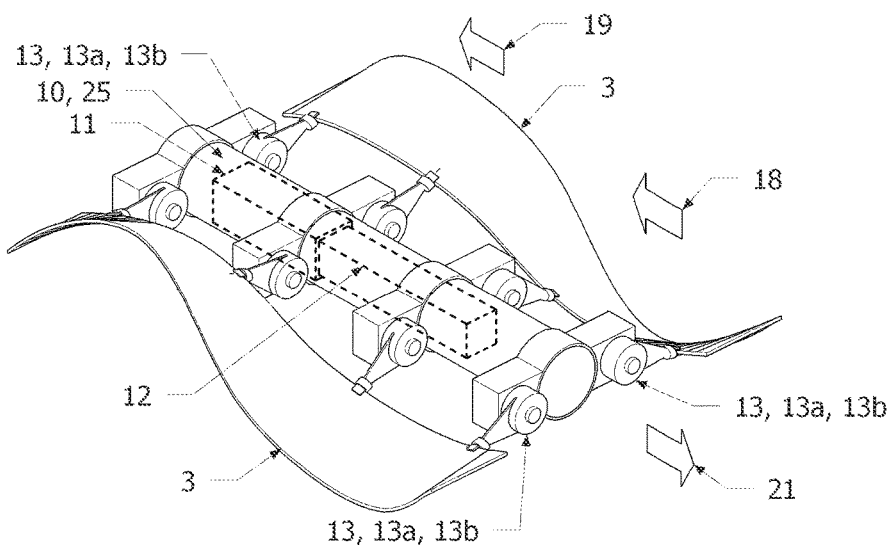
FIG. 7 shows an embodiment of a free-swimming vessel in one embodiment.
Figure 8:
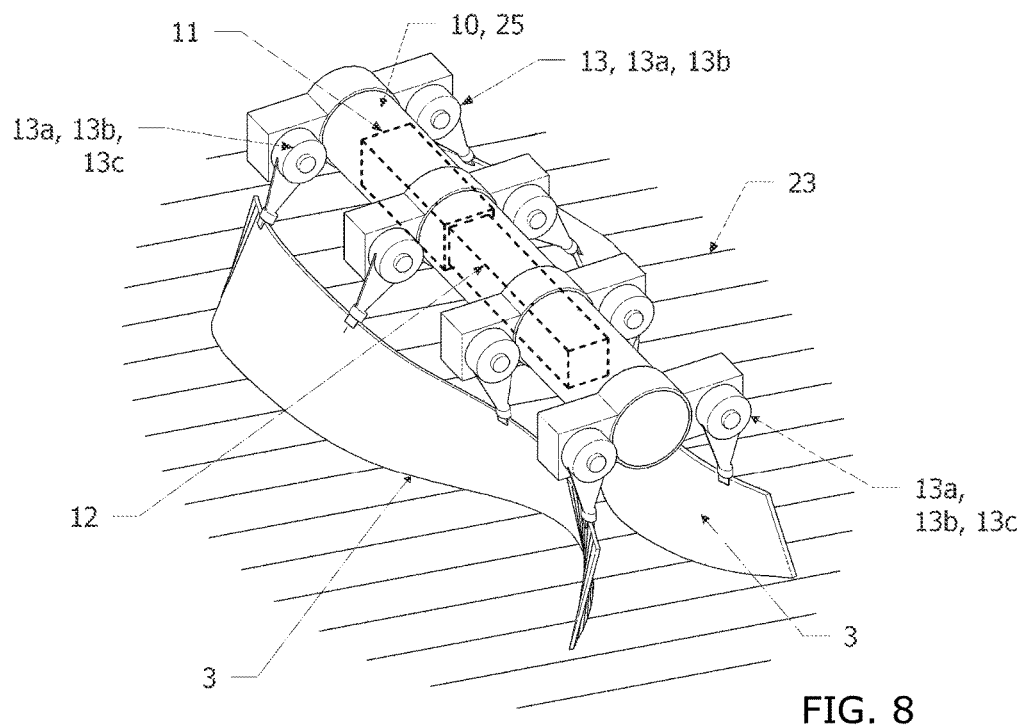
FIG. 8 shows an embodiment of a vessel or vehicle capable of moving on land in one embodiment.

The mechanism illustrated in FIG. 7 may also be configured, in some embodiments, to move itself on land or other substrate 23, e.g., by adjusting the position of the fins 3 to make contact with the land or other substrate 23, and by configuring the transmission assemblies 13, 13a, 13b, via the central controller 12, yielding a crawling or "slithering" action, to move the vessel or vehicle in a desired direction, FIG. 8.

In another implementation, the mechanism described above and illustrated in FIG. 6, instead of being fixed to a body 20 via a harnessing fixture 22, may be fixed to an immovable object or substrate 23 via a harnessing fixture 22. The traveling-wave 19 along the crenated strip fin 3 induced by transmission assemblies 13, 13a, 13b may cause fluid such as air or water to primarily move 18 in the direction of the traveling wave 19, FIG. 9. Applications include fluid-moving devices such as fans or pumps; fluid transportation or mixing, e.g. for industrial and chemical applications; aggregate, particle or powder mixing or transportation, e.g. for industrial and chemical applications, and/or the like.

In another embodiment, the vertebra plate 7 has two or more lobes that may be evenly-spaced and may be rotationally symmetrical about the axis of the shaft 8. A three-lobed vertebra plate 24 is shown for example in FIG. 10. The common member 10 described above in this embodiment may be a chassis-like structure 10, 25 consisting of at least mainly longitudinal elements 10, 25, 26 and at least mainly transverse elements 10, 25, 27 to which at least one actuator 9 is fixed. The actuator 9 or actuators 9 are fixed to the chassis 25 which provides reaction torque for the actuator 9 or actuators 9. A crenated strip fin 3 is fixed to at least one lobed vertebra plate 24 via the first coupling 5. In one embodiment at least one actuator 9 is employed to actuate at least one lobed vertebra plate 24. In one embodiment a central controller 12 controls the actuator 9 or actuators 9 and a battery 11 or other power source powers the central controller 12 and actuator 9 or actuators 9.

Figure 10:
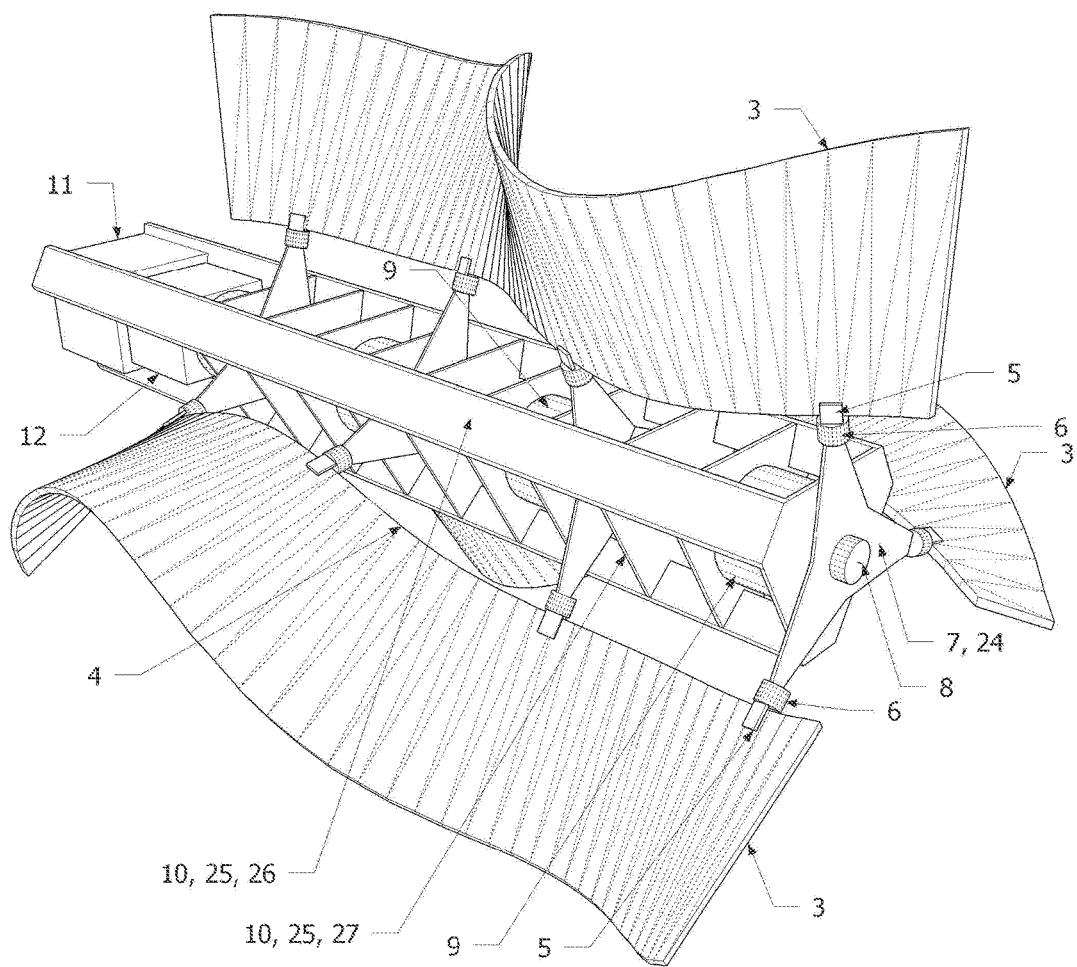
FIG. 10 shows another implementation of one embodiment.
Figure 11:
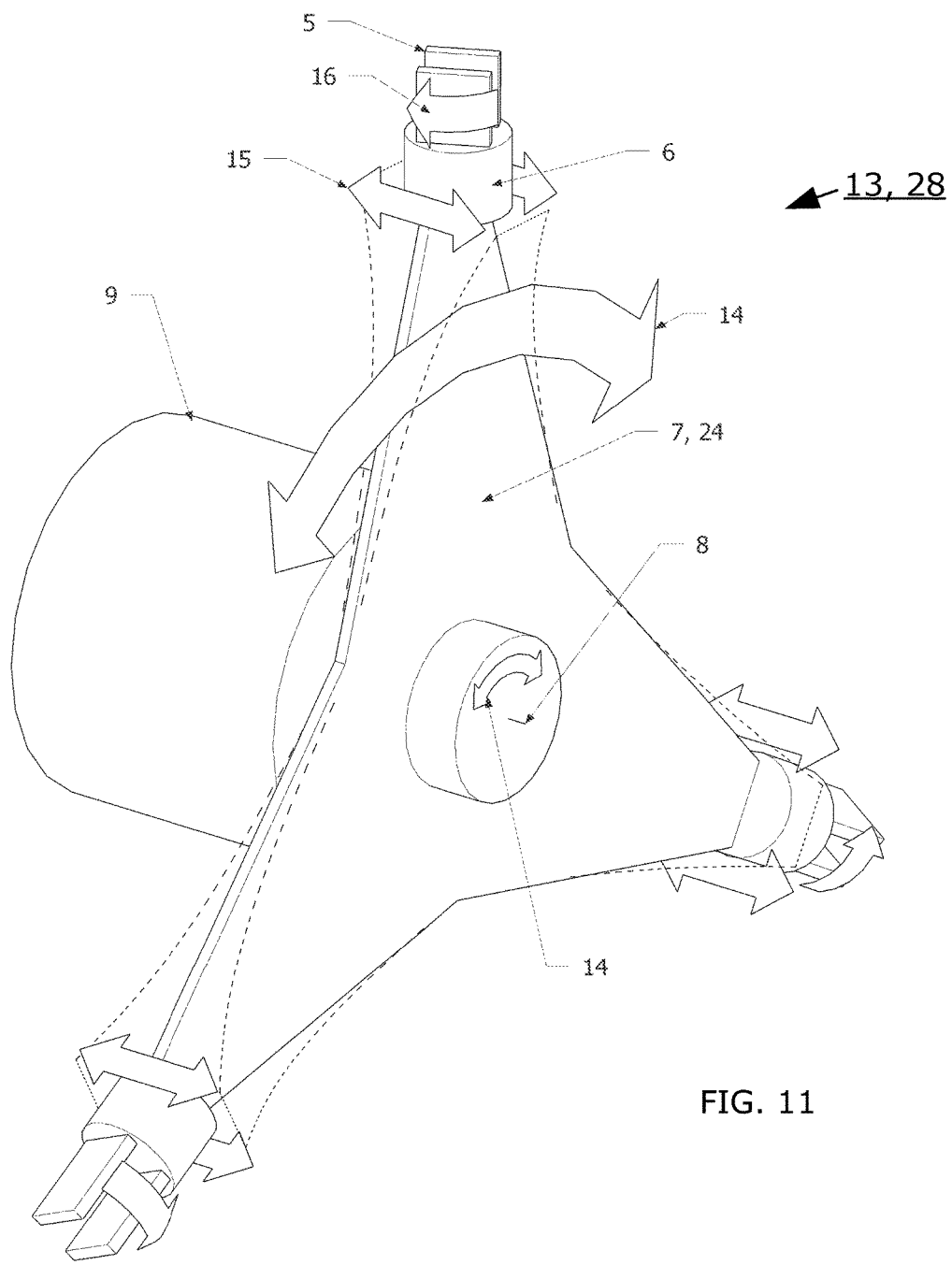
FIG. 11 shows details of a transmission assembly in one embodiment.

The transmission assembly 13, 28, FIG. 11, for the embodiment shown in FIG. 10 may in one embodiment be comprised of a first coupling 5, rotation-enabling component 6, lobed vertebra plate 24 and shaft 8 powered by an actuator 9 and allow three degrees of freedom of motion.

Figure 9:
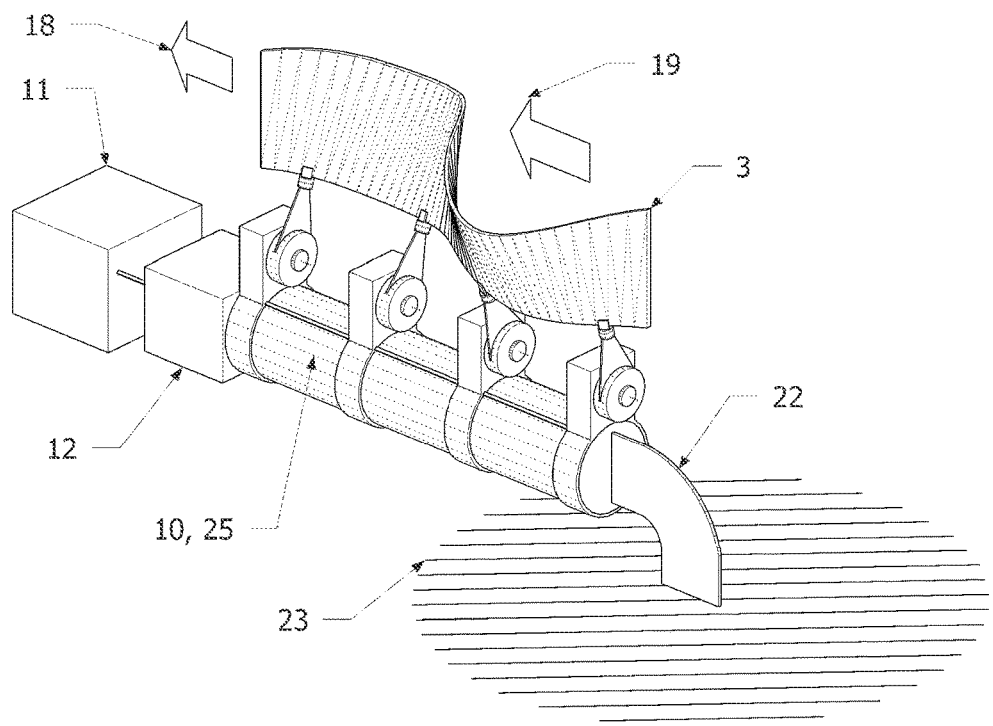
FIG. 9 shows and embodiment attached to an immovable object or substrate and mode of operation in one embodiment.
Figure 12:
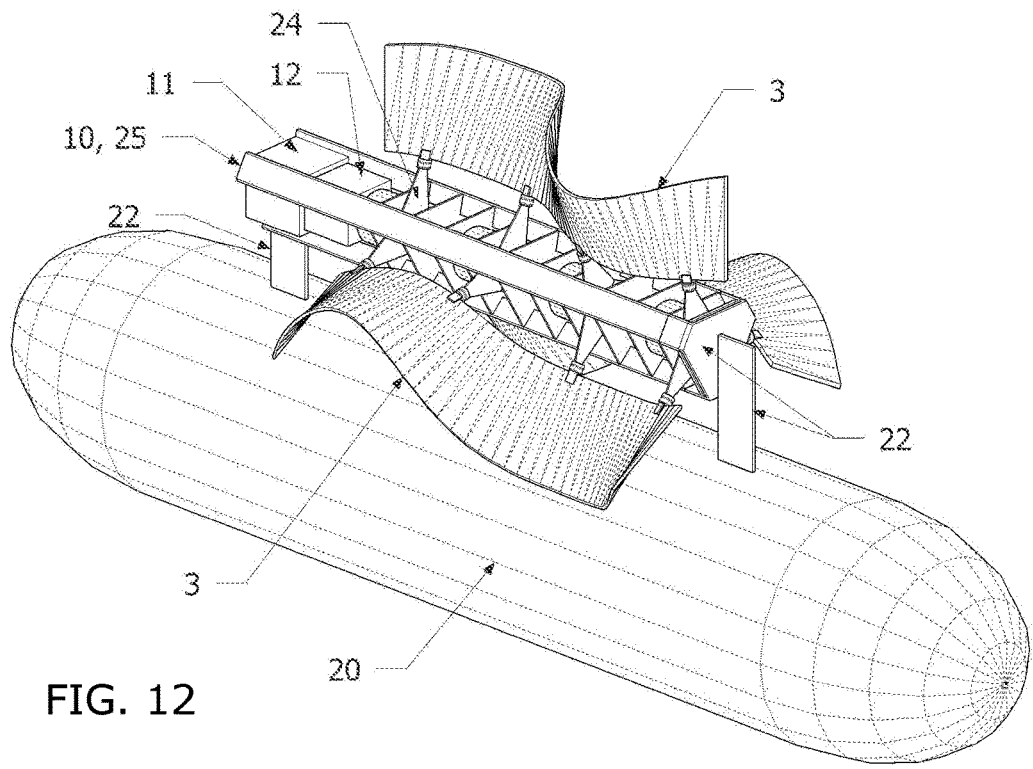
FIG. 12 shows an implementation attached to a vessel in one embodiment.
Figure 13:
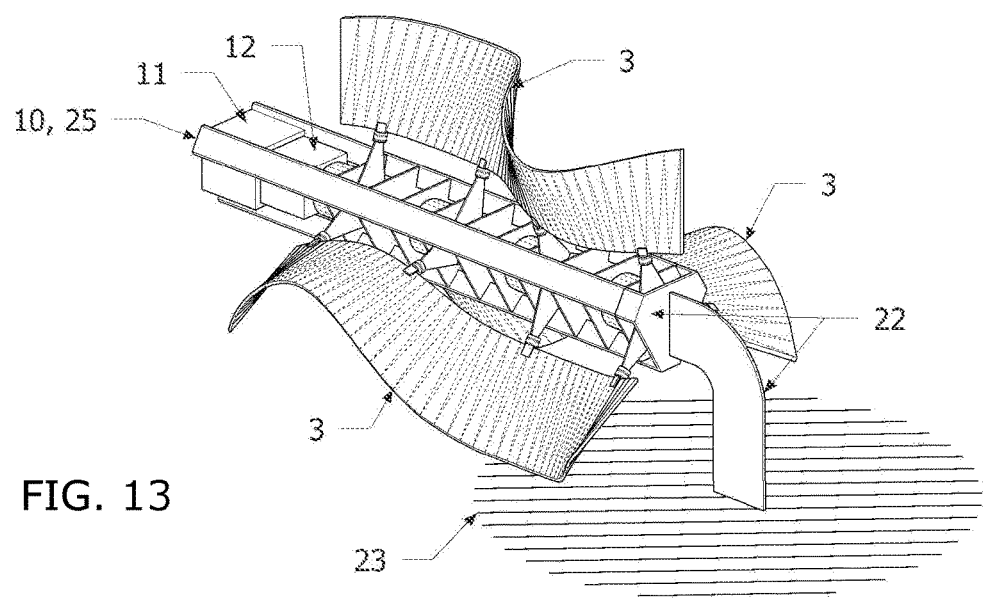
FIG. 13 shows an implementation attached to an immovable object or substrate in one embodiment.

In another embodiment, one or more harnessing fixtures 22 may be added at a location or locations on the chassis 10, 25, so that the mechanism may be fixed to another body or to an immovable object or substrate 23. In embodiments where the other body 20 is a vessel, such as a boat, submersible or lighter-than-air craft, FIG. 12, the mechanism under operation may provide propulsive thrust in the manner shown in FIG. 6. In embodiments where the other body is an immovable object or substrate 23, FIG. 13, the mechanism under operation may move ambient fluid in a desired direction or desired directions for the purposes of fluid transport or for the purposes of fluid, particle and aggregate mixing, in a similar manner as shown in FIG. 9.

In another embodiment, the actuators 9 are electromagnetic and/or other transducers capable of energy harnessing. In such an embodiment, when the harnessing fixture 22 is attached to an immovable object or substrate 23, ambient fluid with directional motion may cause the deformations of the crenated strips 3 to move in a traveling wave in the direction of fluid motion. Kinetic energy from the moving fluid is transferred to the crenated strip 3 and may be converted into electrical energy via the actuators 9. In one embodiment the energy may be stored in a battery 11, FIGS. 9, 13, 14.

Figure 14:
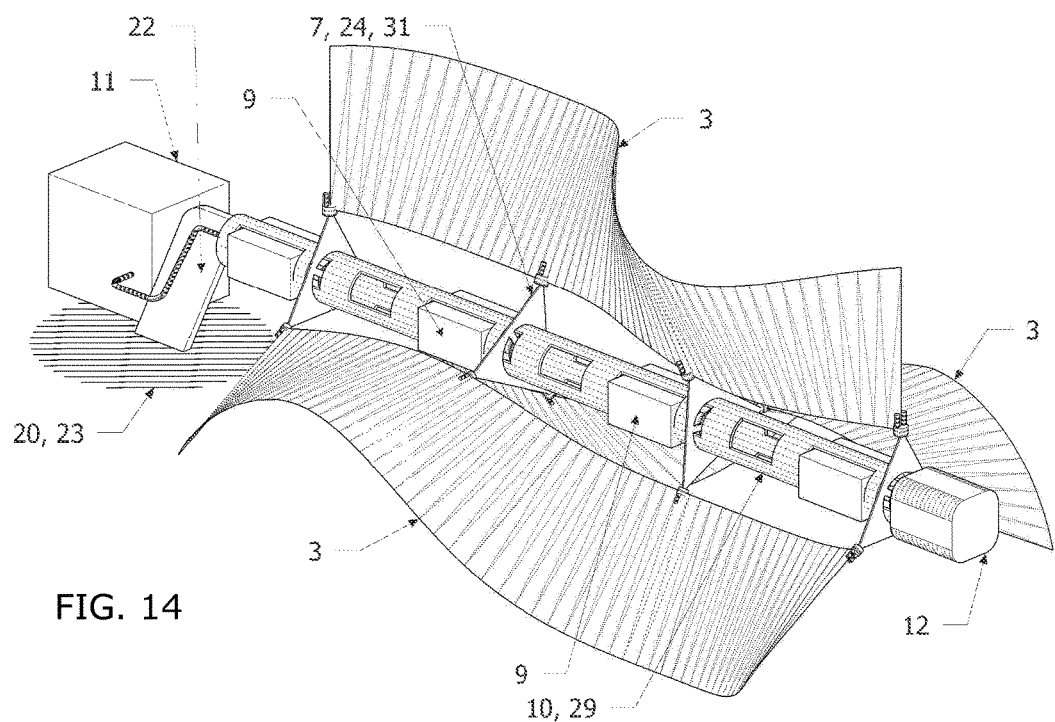
FIG. 14 shows another implementation of one embodiment.

In another embodiment the common member 10 is a chassis-like structure 29 to which the actuators 9 are fixed, FIG. 14. In one implementation the chassis-like structure 29 passes contiguously through slots 30 in vertebra plates 7, 24 to make them slotted vertebra plates 31 allowing the actuators 9 to rotate the slotted vertebra plates 31 without colliding with the chassis-like structure 29.

Figure 15:
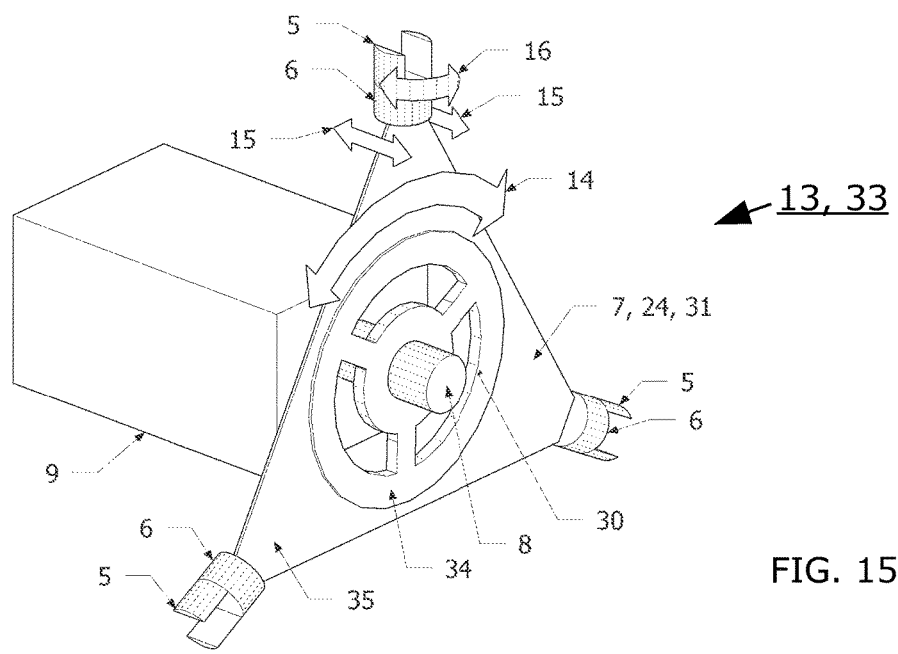
FIG. 15 shows details of a transmission assembly of one embodiment.

In one implementation the transmission assembly 33, FIG. 15 for this embodiment accommodates three degrees of freedom and may consist of a shaft 8 powered by an actuator 9, first couplings 5, rotation-enabling component 6 and slotted vertebra plate 31. In one implementation the inner area 34 of the slotted vertebra plate 31 is thicker or stiffer or wider than the regions 35 nearer the point of attachment to the bearing component, to allow torque transmission from the shaft 8 while also allowing the portion 35 of the slotted vertebra plate 31 near the rotation-enabling component 6 to bend and shift along an axis 15 parallel to that of the shaft 8.

Figure 16:
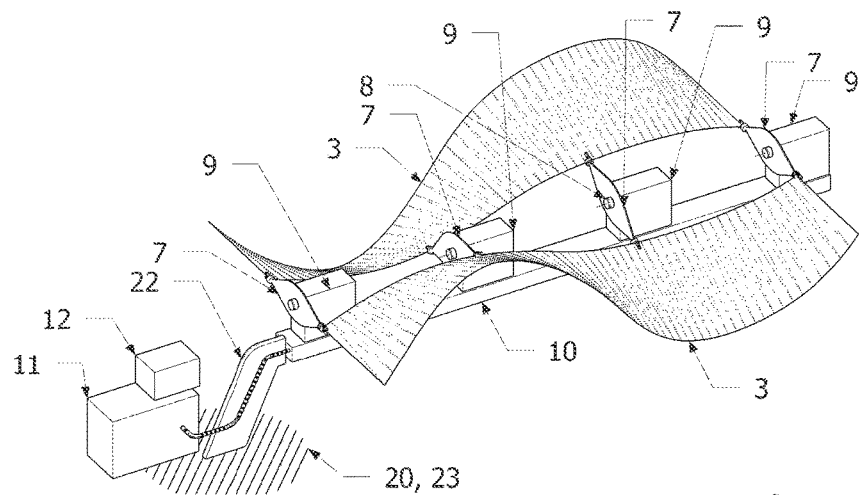
FIG. 16 shows an implementation with two fins sharing common actuators in one embodiment.
Figure 19:
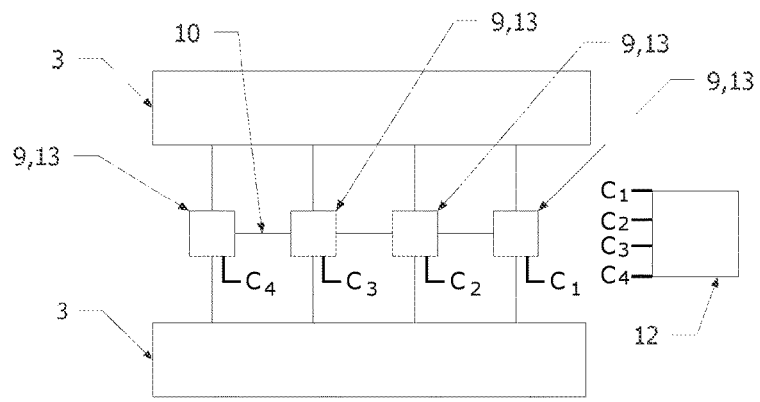
FIG. 19 is a diagram of an implementation with two fins sharing common actuators in one embodiment.

In one embodiment, FIG. 16 and FIG. 19, two or more transmission assemblies 13 powered by actuators 9, fixed to a common member 10, powered by a battery 11 or other power source, and controlled by a central controller 12, may be shared by two or more crenated strip fins 3, FIG. 19. The common member 10 is fixed to a harnessing fixture 22 which is fixed to an immovable object or substrate 23 or the body of a vessel 20 in a similar manner as described in the embodiments above. Clockwise and counter-clockwise rotation of the transmission assemblies 13 may cause the sinusoidal deformations of both crenated strip fins 3 to travel in the same direction as each other along the axis of the shafts 8.

Figure 17:
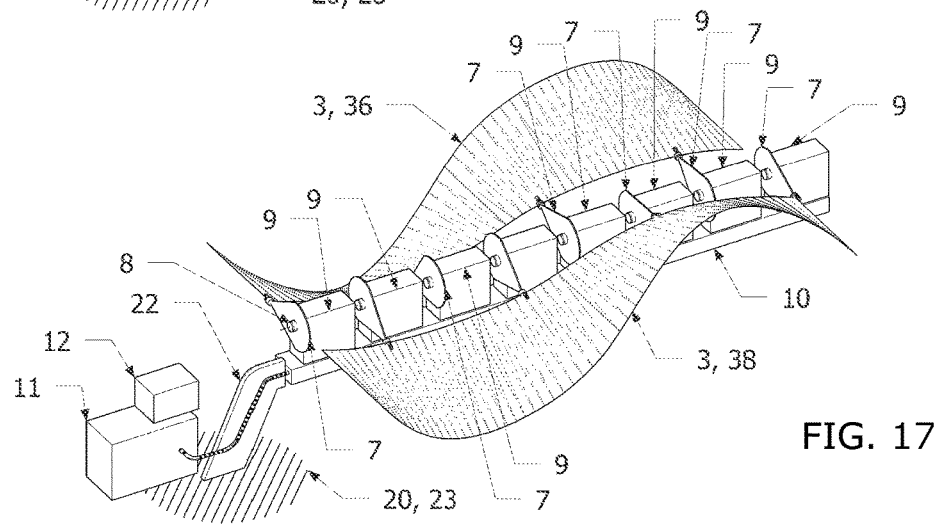
FIG. 17 shows an implementation with two fins on two sets of actuators in one embodiment.
Figure 20:
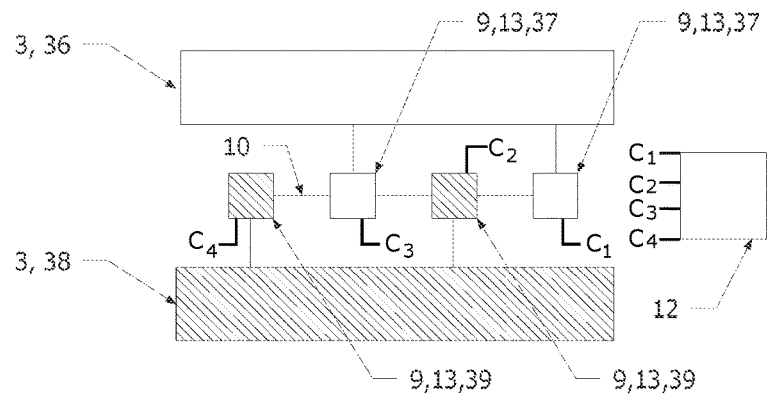
FIG. 20 is a diagram of an implementation with two fins on two sets of actuators in one embodiment.
Figure 21:
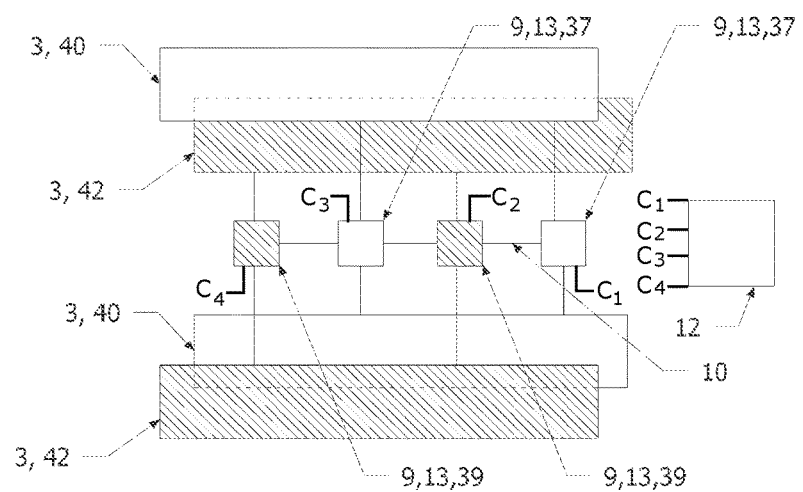
FIG. 21 is a diagram of an implementation with two pairs of fins on two sets of actuators in one embodiment.

In another embodiment with two crenated strip fins 3, FIG. 17 and FIG. 20, one crenated strip fin 3, 36 is attached to one set of transmission assemblies 13, 37 and the other crenated strip fin 3, 38 is connected to a second set of transmission assemblies 13, 39, FIG. 20. This allows one crenated strip fin 3, 36 to operate independently of the other crenated strip fin 3, 38 under control of the central controller 12. This in turn allows in one implementation the deformations of one crenated strip fin 3, 36 to travel in the opposite direction to the other crenated strip fin 3, 38. The degree of transmission assembly 13 rotation may vary between sets of transmission assemblies as well as within a set of transmission assemblies. For a craft utilizing such an embodiment, thrust vectoring is therefore facilitated to control the vessel's pitch, yaw, roll, direction, turning, and other controlled movements which may be executed via the central controller 12. (FIGS. 19-21, for example). Sensors such as accelerometers, gyroscopes, inertial measurement units, compass, optic flow sensors, sonar, lidar, and fluid motion sensors such as pressure and velocity sensors, and/or the like, may feed into the central controller 12 to achieve desired behavior of the vessel, vehicle or mechanism.

Figure 18:
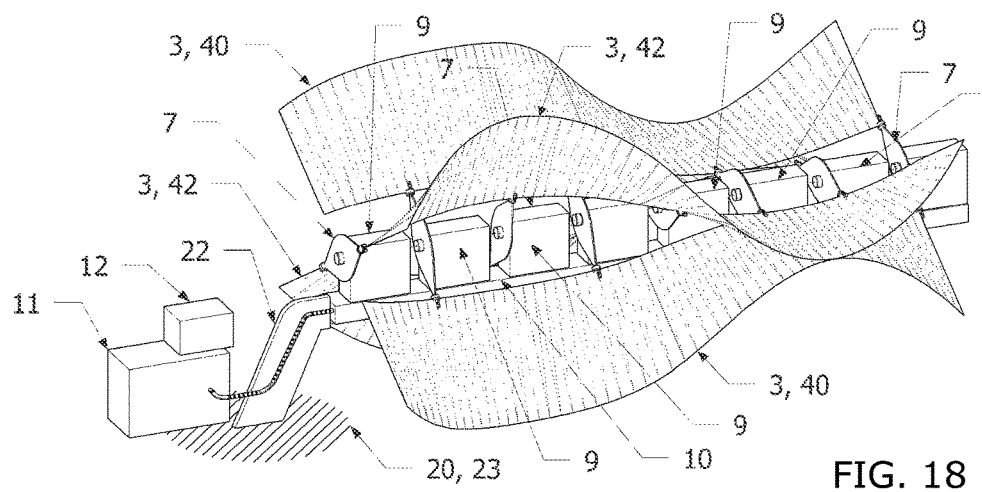
FIG. 18 shows an implementation with two pairs of fins on two sets of actuators in one embodiment.

Another implementation utilizes two pairs of crenated strip fins 3, FIG. 18 and FIG. 21. A first pair 40 is connected to one set of transmission assemblies 13, 37 and a second pair 42 is connected to a second set of transmission assemblies 13, 39, FIG. 21 which may allow the implementation to exert more thrust without adding actuators 9. For a craft utilizing such an embodiment, thrust vectoring may be facilitated to control the vessel's pitch, yaw, roll, direction, turning, and other controlled movements which may be executed via the central controller 12, such as described above.

In another embodiment FIGS. 22-23, a single actuator 43 may be used to drive more than one transmission assembly 13, 44 simultaneously through the use of a crank shaft, Scotch Yoke, cam shaft and/or the like. An example is shown in FIG. 22 using a shaft with conjugate cams, and where a battery or other power source 11 powers at least one actuator 43 attached to a common member 10. Two or more transmission assemblies 13, 44, FIG. 23, are mounted to the common member 10 with transmission assembly mounts 46. Rotation 46a of the cam shaft 47 causes the vertebra plates 7, 48 of two or more transmission assemblies 13, 44 to rotate clockwise and counterclockwise 14 in a similar manner as described in embodiments above. The transmission assemblies 13, 44 are coupled to the crenated strip fin 3 in a similar manner as described in embodiments above. The common member 10 may be attached to an immovable object or substrate 23 or the body of a vessel 20, FIG. 22, in a similar manner and for similar purposes as described in embodiments and implementations above.

Figure 24:
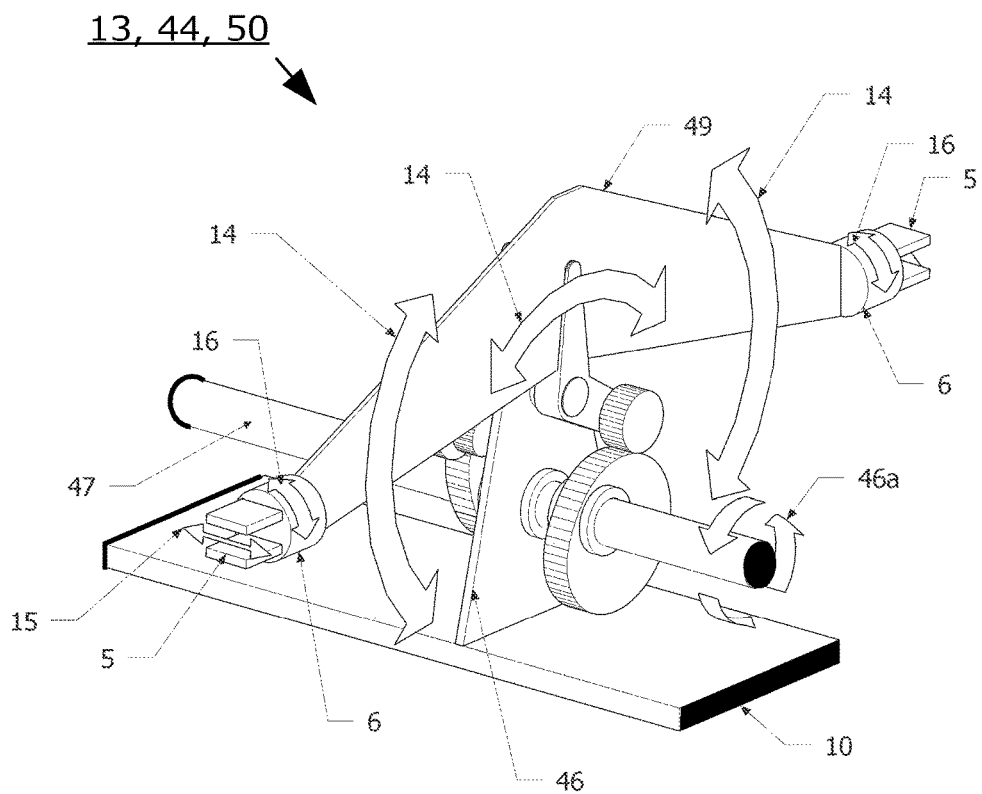
FIG. 24 shows details of a transmission assembly of another implementation having a cam in one embodiment.
Figure 25:
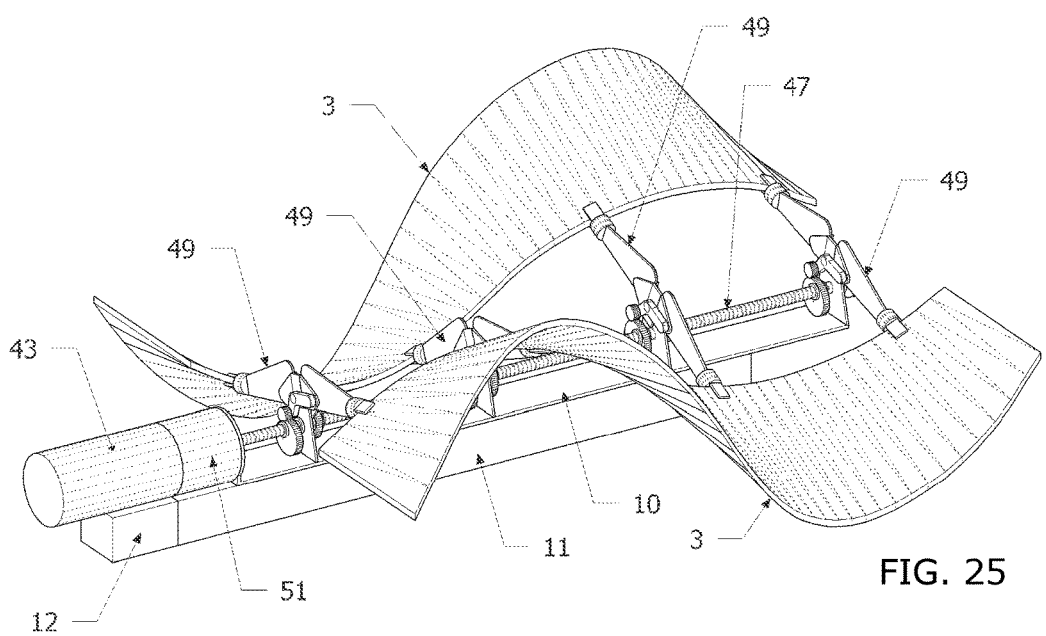
FIG. 25 shows an implementation with two pairs of fins sharing cam driven actuators in one embodiment.

In another embodiment, the transmission assembly 13, 44 may be coupled to two or more crenated strip fins 3 via a lobed vertebra plate 49 with more than one crenated strip fin 3 attachment to the same lobed vertebra plate 49, to create a lobed transmission assembly 50 with more than one fin attached, FIG. 24. At least one lobed transmission assembly 50 mounted to a common member 10 may be actuated via an actuator 43 such as an electric motor and a central controller 12, and powered by a battery 11 or other power source to create a mechanism that may be free-swimming, and which may have a gear box 51 between the actuator and cam shaft 47, FIG. 25.

Figure 26:
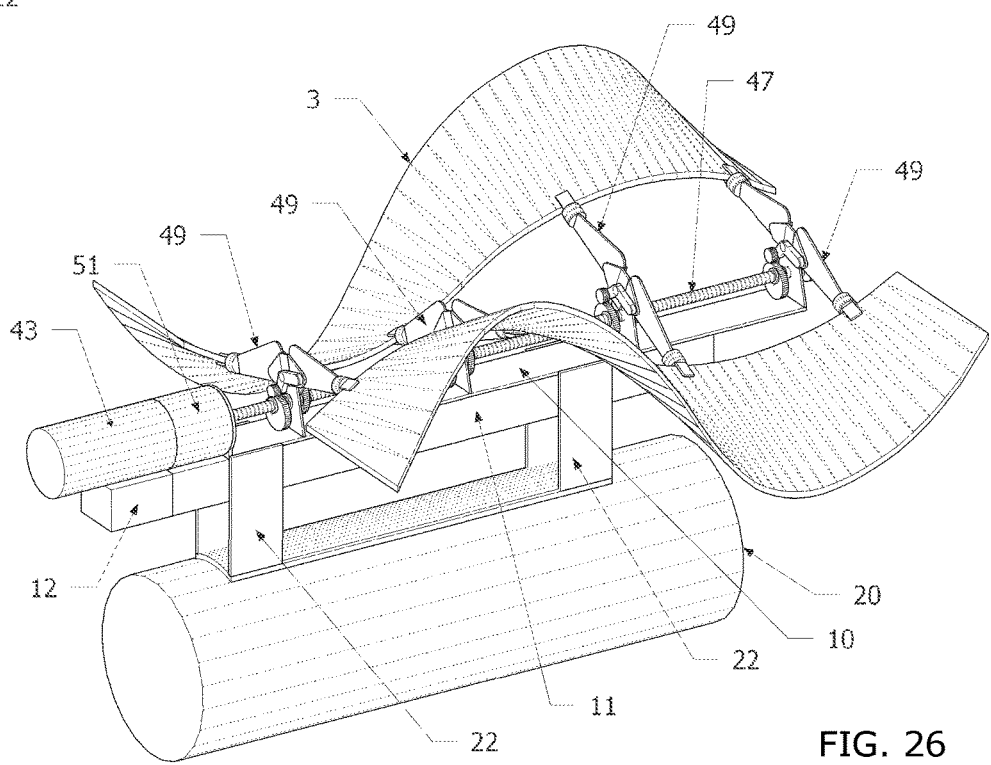
FIG. 26 shows an implementation with two pairs of fins sharing cam driven actuators in another embodiment.

In another embodiment, the mechanism may be attached via one or more harnessing fixtures 22 to a body 20, to provide thrust to the body 20. The body may be a sub-sea vessel, surface craft, or the body part of a person swimming or diving in water, or the body 20 may be attached to equipment worn by a person swimming or diving, FIG. 26.

Figure 27:
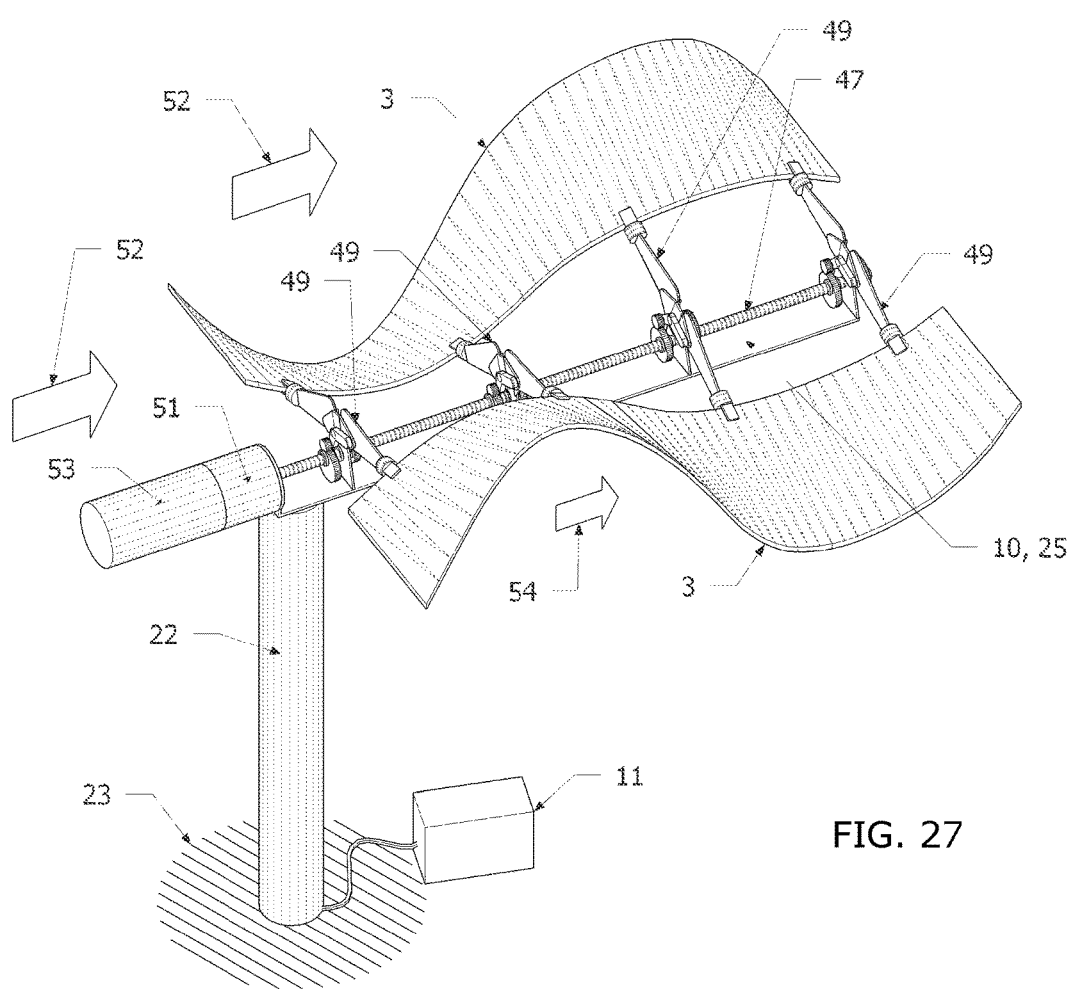
FIG. 27 shows a generator implementation in one embodiment.

In one generator implementation, the common member 10, 25 may be fixed to a harnessing fixture 22 which is fixed to an immovable object or substrate 23, FIG. 27. Moving fluid 52 may exert loads on the fins 3 which may induce the strained deformations in the fins 3 to travel 54 in the direction of the moving fluid 52 to induce rotation of the shaft 47 via transmission assemblies 13, 44, 50. The shaft 47 may be rotationally coupled to a gear box 51 coupled to an electromagnetic generator 53 or other transducer capable of turning rotational action into electrical energy. Electricity from the electromagnetic generator 53 or other transducer may be sent to a battery 11 or an electrical grid.

It is to be understood that the implementations described herein facilitate significant flexibility and that many changes, modifications, variations and other uses and applications of the described implementations are possible. All such changes, modifications, variations and other uses and applications which do not depart from the spirit and scope of the invention are deemed to be covered by the implementations described herein and variants thereof.

In another embodiment, an arched blade 55 is added to one edge of the arc-like flexible sheet-like material 2, FIG. 28. The arched blade 55 may, for example, be made from a hard, flexible material having high resilience such as stainless steel, a hard polymer, and/or the like. The arched blade 55 may, e.g., be attached to the side of one edge of the flexible sheet-like material 2, or it may be inserted into a slot 56 in one edge of the flexible sheet-like material 2, FIGS. 28-29. FIG. 30 shows a cross section through the edge of the flexible sheet-like material 2 in which the arched blade 55 is inserted into a slot 56 and fixed via a rivet, bolt, grommet, or similar coupling component 57 that passes through a hole in the flexible sheet-like material and the arched blade 55. FIG. 31 shows a cross section of an implementation in which the arched blade 55 has a thickening or flange along the edge that is inserted into the slot 56, and where the slot 56 has a widening that accommodates the cross-sectional profile of the arched blade 55 to mechanically hold the arched blade 55 in the slot 56. In addition to or instead of these mechanical means of fixing the arched blade 55 to the flexible sheet-like material 2, glue, or another bonding agent may be applied to secure the arched blade 55 to the flexible sheet-like material 2.

In another implementation of the arched blade 55, the outer radius edge of the arched blade 55 forms a continuous arc but its inner edge is comprised of a series of narrow tabs 58 to reduce in-plane bending loads on the arced blade 55, and a series of eyelets 59 contiguous with the arched blade 55, FIG. 32. In examples of this implementation, the coupling components 57 that pass through the flexible sheet-like material may pass through the eyelets.

Figure 33:
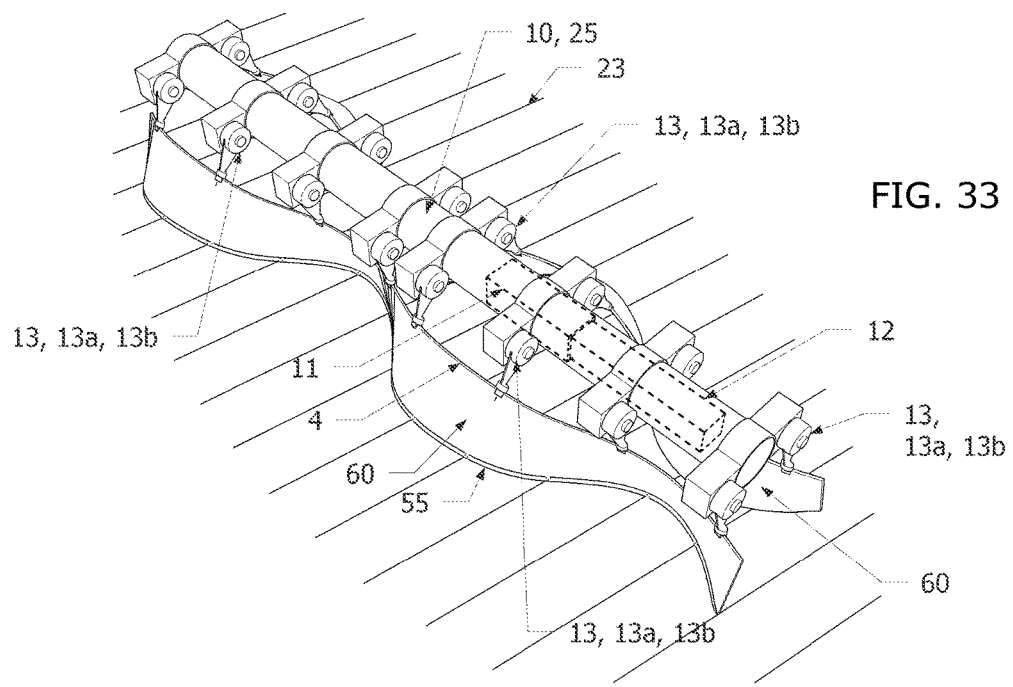
FIG. 33 shows an implementation of two or more composite fin, each coupled to two or more transmission assemblies in one embodiment.

Once the arched blade 55 has been installed in the flexible sheet-like material 2, force or forces 1 are applied to the flexible sheet-like material 2 to which the arched blade 55 has been fixed to create a deformed crenated strip composite fin 60 with strained-deformations. In one propulsion embodiment, two or more composite fins 60 are each coupled to two or more transmission assemblies 13, 13a, 13b powered by motors that are coupled to a common member 10, to create a vehicle capable of "skating" over ice, FIG. 33. A central controller 12 and battery 11 or other power source to power the transmission assemblies 13a, 13b and may be located inside the common member 10.

Figure 34:
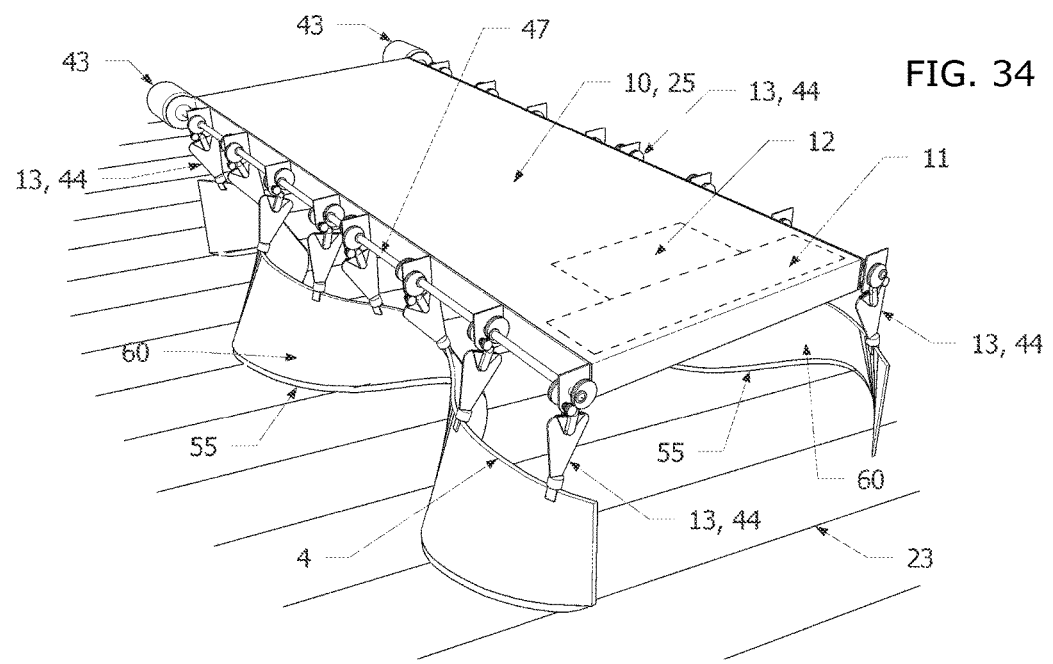
FIG. 34 shows an implementation of a shaft with conjugate cams for each composite fin in one embodiment.

In another embodiment, two or more composite fins 60 are each coupled to two or more transmission assemblies 13, 44 that are coupled to a common member 10, 25 to yield a vehicle that can skate over ice. The transmission assemblies 13, 44 of each fin may be actuated by a motor 43 that operates a crank shaft, Scotch Yoke, cam shaft and/or the like. An example is shown in FIG. 34 using a shaft 47 with conjugate cams for each composite fin 60 whereby a central controller 12 and battery 11 or other power source power a motor for each composite fin 60, allowing independent control of the speed and direction of undulation-travel for each composite fin 60. Independent control of each composite fin 60 allows for direction change and maneuverability of the vehicle over the ice. In alternative implementations, a single motor and/or coupled control for both composite fins may be provided.

What is claimed is:

1. An articulated mechanism for imparting kinetic energy into a fluid or harnessing energy from a fluid comprising—
   a first article comprised of an arched blade affixed to a sheet-like flexible material to which force is applied to create strained deformations expressing the internal energy state of the article,
   at least two coupling members connected to the same edge of the first article and to a common member by way of an intermediate transmission assembly,
   wherein the coupling members, common member and transmission assembly together constitute a physical restraint that maintains the persistence of strained deformations in the first article,
   wherein the transmission assembly allows the first article three degrees of freedom of motion relative to the common member.

2. The mechanism of claim 1, wherein the common member comprises a chassis.

3. The mechanism of claim 2, wherein the chassis is coupled by at least one point along its length to at least one harnessing fixture.

4. The mechanism of claim 3, wherein the harnessing fixture is attached to a vessel.

5. The mechanism of claim 4, wherein the vessel comprises a submersible craft.

6. The mechanism of claim 4, wherein the vessel comprises a lighter-than-air craft.

7. The mechanism of claim 3 wherein the harnessing fixture is secured to a fixed substrate.

8. The mechanism of claim 3, wherein the harnessing fixture is secured to swimmer-wearable equipment.

9. The mechanism of claim 1, wherein each coupling member is rotatably coupled at one end to the same edge of the first article.

10. The mechanism of claim 9, wherein each coupling member is rotatably coupled at one end to the same edge of the first article via at least one bearing.

11. The mechanism of claim 1, wherein each coupling member is rotatably coupled to the transmission assembly.

12. The mechanism of claim 1, wherein each coupling member comprises a vertebra plate.

13. The mechanism of claim 12, wherein the vertebra plate comprises a lobed vertebra plate, and the sheet-like flexible material comprises at least two flexible sheets, each of the two flexible sheets being attached to a corresponding lobe of the lobed vertebra plate.

14. The mechanism of claim 1, wherein the sheet-like flexible material comprises a crenated strip.

15. The mechanism of claim 1, wherein the plurality of coupling members are coupled, via the intermediate transmission assembly, to at least one transducer.

16. The mechanism of claim 15, wherein the at least one transducer comprises an electromagnetic motor.

17. The mechanism of claim 15, wherein the at least one transducer comprises an electromagnetic generator.

18. The mechanism of claim 17, further comprising:
at least one battery electrically coupled to the electromagnetic generator and configured to store electrical energy generated by the electromagnetic generator.

19. The mechanism of claim 1, wherein the sheet-like flexible material comprises at least two flexible sheets, and wherein the plurality of coupling members point in a substantially common direction such that the at least two flexible sheets contact a solid substrate whereby the traveling wave of each flexible sheet induces a crawling action.

\* \* \* \* \*